(12) United States Patent
Makansi et al.

(10) Patent No.: US 11,649,994 B2
(45) Date of Patent: *May 16, 2023

(54) THERMOELECTRIC STRING, PANEL, AND COVERS FOR FUNCTION AND DURABILITY

(71) Applicant: Lear Corporation, Southfield, MI (US)

(72) Inventors: Tarek Makansi, Tucson, AZ (US); John L. Franklin, Tucson, AZ (US); Mark N. Evers, Tucson, AZ (US); Kevin C. Forbes, Tucson, AZ (US); Jose Santos Dominguez, Bisbee, AZ (US); Michael T. Sato, Tucson, AZ (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/313,989

(22) Filed: May 6, 2021

(65) Prior Publication Data

US 2022/0205689 A1 Jun. 30, 2022

Related U.S. Application Data

(63) Continuation of application No. 17/036,770, filed on Sep. 29, 2020, now abandoned, which is a continuation of application No. 16/249,650, filed on Jan. 16, 2019, now Pat. No. 10,830,507, which is a continuation of application No. 14/530,360, filed on Oct. 31, 2014, now Pat. No. 10,228,165.

(Continued)

(51) Int. Cl.
*F25B 21/02* (2006.01)
*B60N 2/56* (2006.01)
*A47C 21/04* (2006.01)
*A61G 5/10* (2006.01)
*A47C 7/74* (2006.01)
*F25B 21/04* (2006.01)
*A61G 7/057* (2006.01)

(52) U.S. Cl.
CPC .............. *F25B 21/02* (2013.01); *A47C 7/742* (2013.01); *A47C 7/744* (2013.01); *A47C 21/044* (2013.01); *A61G 5/1043* (2013.01); *B60N 2/5692* (2013.01); *A61G 7/05707* (2013.01); *F25B 21/04* (2013.01); *F25B 2321/02* (2013.01); *F25B 2321/0251* (2013.01)

(58) Field of Classification Search
CPC .............. A47C 21/044; A61G 7/05707; F25B 2321/023; F25B 2321/0251
See application file for complete search history.

(56) References Cited

U.S. PATENT DOCUMENTS 6,223,539 B1 * 5/2001 Bell ........................ H01L 35/30
62/3.3
7,152,412 B2 * 12/2006 Harvie ................. B60N 2/5692
62/3.5

(Continued)

*Primary Examiner* — Filip Zec
(74) *Attorney, Agent, or Firm* — MacMillan, Sobanski & Todd, LLC (57) ABSTRACT

A thermoelectric device comprising an elongated panel of two foam layers, and having an inserted thermoelectric string is incorporated into a seat cushion, planting pot, and battery thermal manager. Several enhancements to the string and the panel improve its durability, visual appeal, and tactile appeal over the prior art.

19 Claims, 13 Drawing Sheets

Diagram of thermoelectric panel for heating and cooling a battery

Related U.S. Application Data

(60) Provisional application No. 61/899,665, filed on Nov. 4, 2013, provisional application No. 61/939,619, filed on Feb. 13, 2014, provisional application No. 62/019,849, filed on Jul. 1, 2014.

(56) References Cited

U.S. PATENT DOCUMENTS

| | | | |
|---|---|---|---|
| 7,273,490 B2 * | 9/2007 | Lachenbruch | A61G 7/05784 607/104 |
| 9,272,647 B2 * | 3/2016 | Gawade | B60N 2/5692 |

* cited by examiner

FIG. 4A Octagon Pillars with 4 Wire Cuts Top and Side Views

FIG. 4B Hexagon Pillars with 3 Wire Cuts Top and Side Views

Wire Cut of Pillar Geometries

FIG. 9A Plant Production vs. Temperature

FIG. 9B Optimal Temperature of Popular Plants

Relationship of Temperature on Plant Production

Diagram of thermoelectric panel for heating and cooling a battery

THERMOELECTRIC STRING, PANEL, AND COVERS FOR FUNCTION AND DURABILITY

CROSS-REFERENCE

This application is a continuation of U.S. application Ser. No. 17/036,770, filed Sep. 29, 2020, which is a continuation of U.S. application Ser. No. 16/249,650, filed Jan. 16, 2019, now U.S. Pat. No. 10,830,507, which is a continuation of U.S. application Ser. No. 14/530,360, filed Oct. 31, 2014, now U.S. Pat. No. 10,228,165, which claims priority to U.S. Provisional Application No. 61/899,665, filed Nov. 4, 2013, U.S. Provisional Application No. 61/939,619, filed Feb. 13, 2014, and U.S. Provisional Application No. 62/019,849, filed Jul. 1, 2014, which applications are incorporated herein by reference in their entireties for all purposes.

BACKGROUND OF THE INVENTION

In our earlier U.S. patent application Ser. No. 13/101,015 filed May 4, 2011 and Ser. No. 13/394,288 filed Mar. 5, 2012 and PCT Application Serial No. PCT/US11/51227 filed Sep. 12, 2011 and PCT Application Serial No. PCT/US13/050378 filed Jul. 12, 2013, we describe a thermoelectric heating and cooling system comprising a connected string of thermoelectric elements woven into an insulating panel, which may be comprised of a soft material like foam, memory foam, batting, or natural fabrics. A conductor material is expanded on either side of the panel to distribute heat on one side and cooling on the other. Such a material or surface upgraded with thermoelectric heating and cooling in this manner is called a distributed thermoelectric panel. In our earlier applications, integration of that insulating panel with mattresses, chairs, and blankets was also described. The end result was a relatively low cost, distributed heating and cooling addition to bedding, seats, blankets, electronics, and other products.

SUMMARY OF THE INVENTION

The present invention provides various enhancements and improvements to heated and cooled products and their components over the prior art. The present invention introduces new designs for heated and cooled office cushions, battery thermal management systems, and plant soil temperature control systems. In addition, the present invention provides improvements to the design of the thermoelectric string that increases durability of the office cushion and other improvements that increase the cushion's tactile and visual appeal.

More particularly, in accordance with the present invention, we provide a heated and cooled office cushion for improving comfort and saving energy, a heated and cooled planting pot for controlling soil temperature and improving plant productivity, and a battery thermal management system for improving battery power and safety. We also provide various designs of strain reliefs for the thermoelectric string that increase its durability when combined with a seat cushion and used for long periods. Finally, we provide patterned designs of the cushion's cover and foam surface to improve both tactile feel and visual appearance of the cushion.

More particularly, we provide a thermoelectric cooling device comprising a thermoelectric string inserted into a multi-layer foam stack wherein a first layer is optimized for softness and a second layer is optimized for softness and airflow combined. In one embodiment, the thermoelectric cooling device is incorporated into a seat cushion including a fan and electrical power source.

In one embodiment the device includes one or more of the following features: a battery for temporary cordless operation, an occupancy switch that turns off the device when not in use, a means for varying magnitude and polarity of the voltage or current applied to the thermoelectric string, an electronics enclosure.

In another embodiment the device allows the airflow to exit in multiple directions to compensate for blockage in one direction.

In yet another embodiment the second layer has pillars to allow airflow therebetween. In such embodiment the pillars' cross-section preferably is circular, square, hexagonal, or octagonal. Also, the pillars preferably are formed by molding, by routing, or by linear wire cutting, wherein the wire cutting preferably employs a hot wire, an abrasive wire, or a vibrating wire. Also, if desired, the pillars may be staggered from one row to a next row to maximize uniformity of airflow.

In one embodiment the thermoelectric string further comprises a strain relief to prevent breaking of the string's wires during repeated and long term use. In such embodiment the strain relief preferably is a foam plug that encapsulates the thermoelectric elements and has channels for the string's wires to exit the plug, wherein the foam plug preferably has a Y cut shape or a drilled hole. In another embodiment the device comprises tubing and flaps or nipples of latex, rubber, silicone, Teflon, polyurethane, or plastic, optionally combined with another material to insulate the link wires that connect the thermoelectric elements.

In yet another embodiment the strain relief comprises tape attached along the string and extending beyond the thermoelectric elements wherein the tape is comprised of foam, rubber, plastic, Teflon, gel, or a solidifying liquid. In such embodiment, the tape preferably includes fibers for increasing its tensile strength wherein the fibers are glass, nylon, or cloth.

In another embodiment the strain relief comprises cloth woven together with the wire strands.

In another embodiment a plane of the thermoelectric elements and emanating wires in the first foam layer intersects a surface of the device at an angle substantially less than 90 degrees.

In such embodiment, the thermoelectric elements preferably are placed directly above the pillars or above and between the pillars.

In another embodiment, the strands of the woven wire on the surface are shaped to increase their ability to lengthen or otherwise move under stress.

In another embodiment the wires of thermoelectric string are placed in the foam layers such that stress cycles during use avoid a plastic deformation regime of the bending of the wires.

Alternatively, the thermoelectric elements are placed underneath a flap of foam in the first foam layer.

In one embodiment material is added between the stranded wires along the surface to make the surface smoother. In such embodiment the material preferably is matched in firmness or profile height or both to the stranded wires.

In one embodiment the device is covered by a textured material comprising textile, rubber, vinyl, leather, or other seat covering material. In such embodiment the texture is formed by embossing, or additional stitching. Also, in such embodiment the dimensions and separation of the texture features preferably closely match dimensions and separation of the stranded wires, In one embodiment, the device is incorporated into the perimeter of a pot containing soil for plants.

In such embodiment the thermoelectric panel preferably is sandwiched between two walls of the pot, and airflow optionally is outside the sandwich of either natural or forced convection. In one embodiment, the device is incorporated into the outside of a battery for thermal management, or is combined with a heat spreader to move the airflow layer to another location. In such other embodiment, the heat spreader preferably comprises fluid flow or phase change materials.

DETAILED DESCRIPTION OF THE INVENTION

In a prior PCT Application Serial No. PCT/US13/050378 filed Jul. 12, 2013, the inventors described how an array of foam pillars underneath a thermoelectric panel could allow for airflow across heat exchangers made from braided or stranded wire. The pillars, attached to the insulating foam layer, permit independent vertical movement thereby distributing pressure evenly. The inventors shown in PCT Application Serial No. PCT/US13/050378 filed Jul. 12, 2013 that this construction could retain the pressure distribution characteristics of whatever cushioning was underneath, which is a significant feature for a generalized heating/cooling layer that may be applied to a variety of surfaces.

In this application, we show methods for manufacturing the pillars and optimizing their shape, protecting the wire and thermoelectric elements from cyclic stress, smoothing the surface, and constructing an entire heated and cooled cushion using a small number of parts with low manufacturing costs.

Figure 1A:
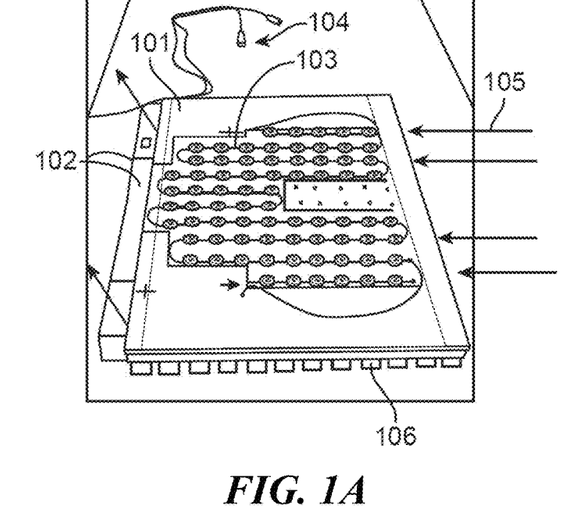
FIGS. 1A, 1B, 1C and 1D show the interior parts of a low-cost cushion for use in offices and homes to improve comfort and save energy on central heating and cooling.
Figure 1B:
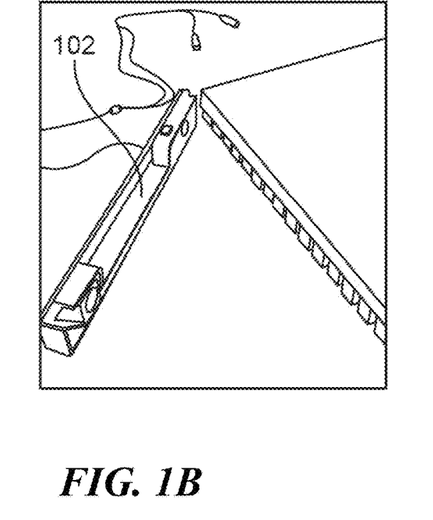
Figure 1C:
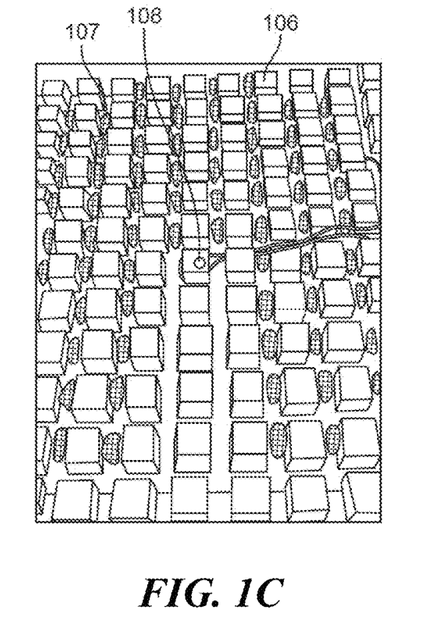
Figure 1D:
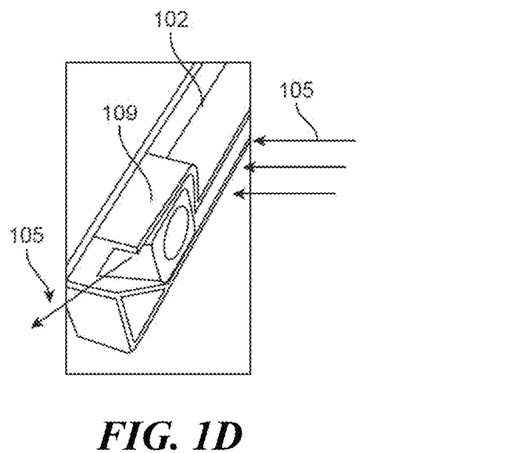

FIGS. 1A-1D show the internals of a completed form-factor cushion. FIG. 1A shows the two layers 101 and 106 of foam arranged as described in PCT Application Serial No. PCT/US13/050378 and having the thermoelectric string 103 inserted into the top layer, and pillars 106 in the bottom layer. The heat exchangers 107 made from stranded wire are exposed in the airflow layer as shown in the underside view of FIG. 1C. The red button 108 in the center of FIG. 1C is a pushbutton switch that acts as an occupancy switch to turn on the heating or cooling when a user is sitting or lying down on the cushion. Without limitation, an occupancy sensor could replace the switch. Such a sensor inputting to control electronics could perform the same function.

FIG. 1B shows the electronics enclosure 102 at the back of the cushion separated from the panel. This enclosure contains or may contain the fans 109, airflow ducting 105, control electronics, wiring 104, power connectors, switches, knobs, and batteries. The fans 109 pull air 105 from the front of the cushion shown by the arrows in FIG. 1A. As shown in FIG. 1C, the fans push the air 105 upward but diagonally away from the user assuming the user is in the sitting position as shown in the close up view in FIG. 1C.

Figure 2A:
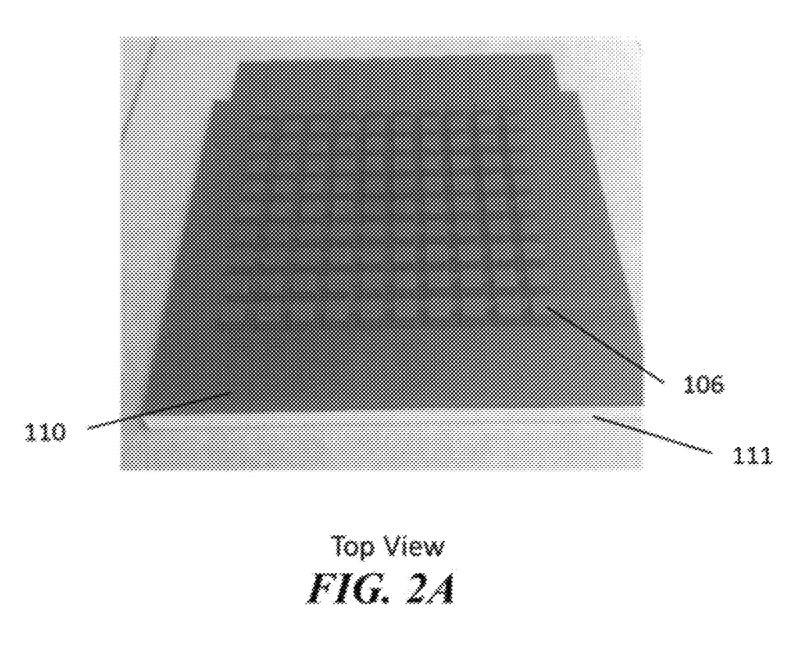
FIGS. 2A and 2B show the two-layer foam construction comprising the insulating panel and the airflow layer for use in the cushion.
Figure 2B:
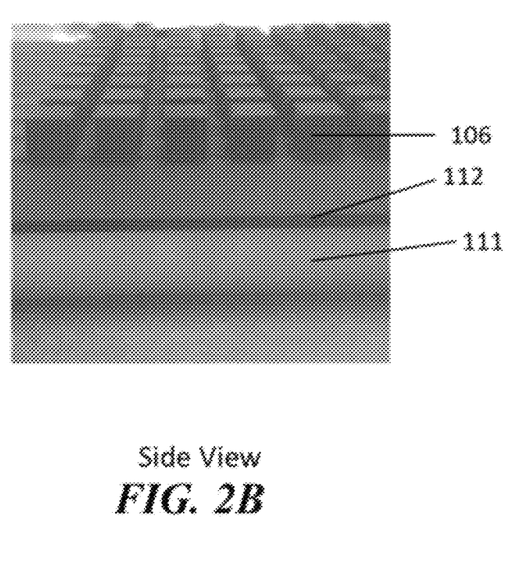

FIGS. 2A-2B show two views of a manufactured, dual-layer foam stack with one layer 112 and 106 patterned with pillars. First, the optimum type of foam for the continuous layer 111 is selected for comfort and feel, as this layer will become the foam surface of the cushion. Next, the optimum type of foam for the pillared layer 112 and 106 is selected to allow airflow when under pressure of the user. To begin the manufacture, two continuous layers of each type of foam are bonded together. Then, the pillars are formed. FIGS. 2A-2B show the pillars formed using a router machine, which routs out the channels between the pillars. Without limitation, the pillars can also be formed using a hot wire cut machine, wherein the hot wire traverses a U shaped path to construct a channel. Without limitation, many hot wires could be employed simultaneously to increase throughput. Also without limitation, the patterned pillars 106 and 112 in FIGS. 2A-2B could be formed in a mold as the foam is produced. The continuous layer 111 could be formed in place on top of the pillared layer 112 and 106, or be bonded afterwards.

Figure 3A:
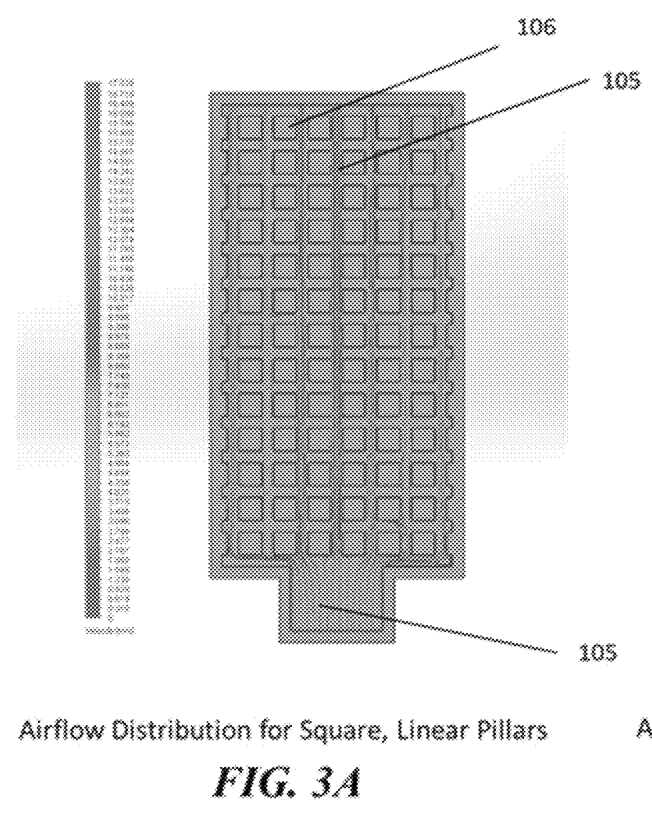
FIGS. 3A and 3B show simulation results of the airflow distribution for two designs of the airflow layer for use in the cushion.
Figure 3B:
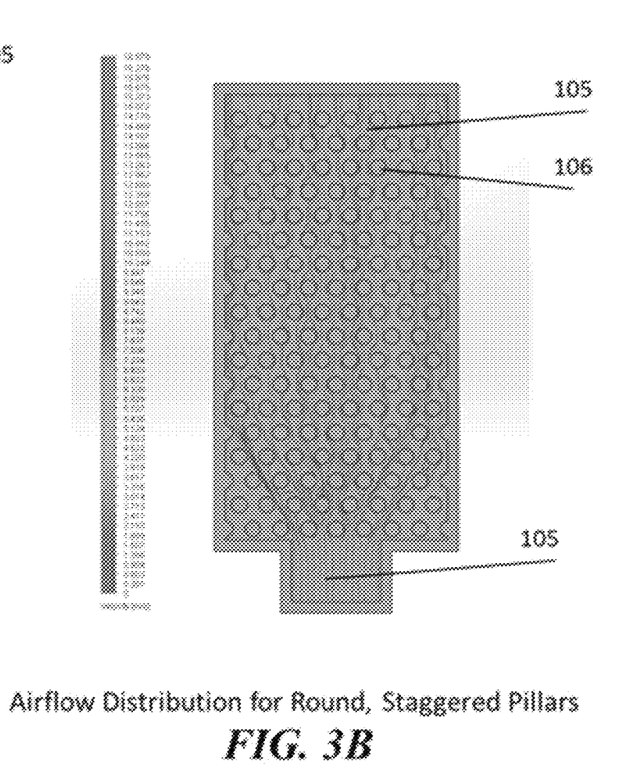

Analysis and simulations performed by the inventors indicate that square pillars 106 like the ones in FIGS. 2A-2B are not the optimal shape for airflow. Staggered round pillars 106 allow more uniform airflow 105, as indicated in the computer-aided analysis illustrated in FIGS. 3A and 3B.

Figure 4A:
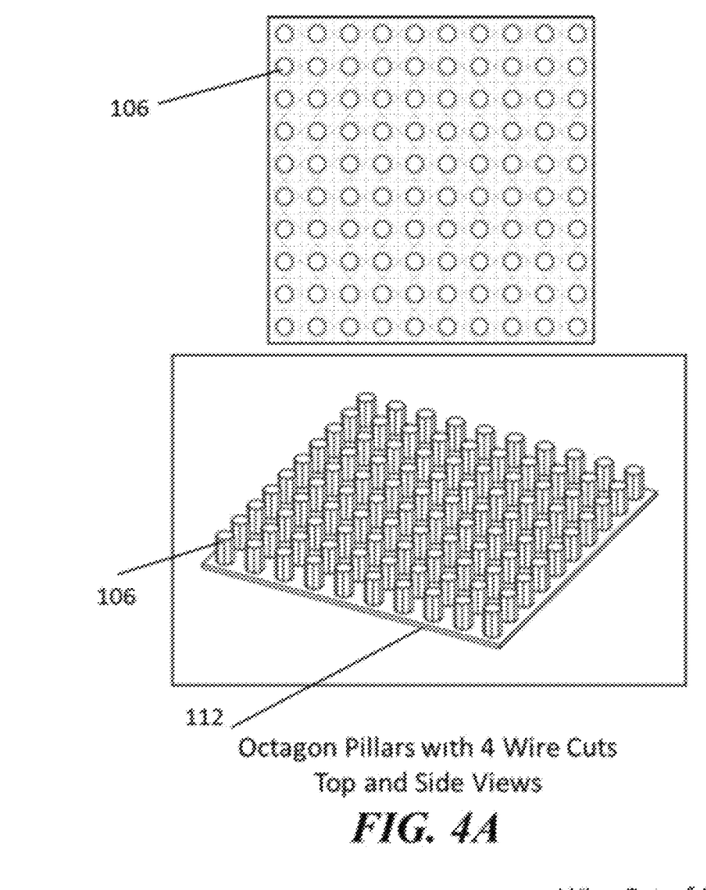
FIGS. 4A and 4B show how round pillars for the airflow layer may be approximated by making linear cuts to the foam in the airflow layer for use in the cushion.
Figure 4B:
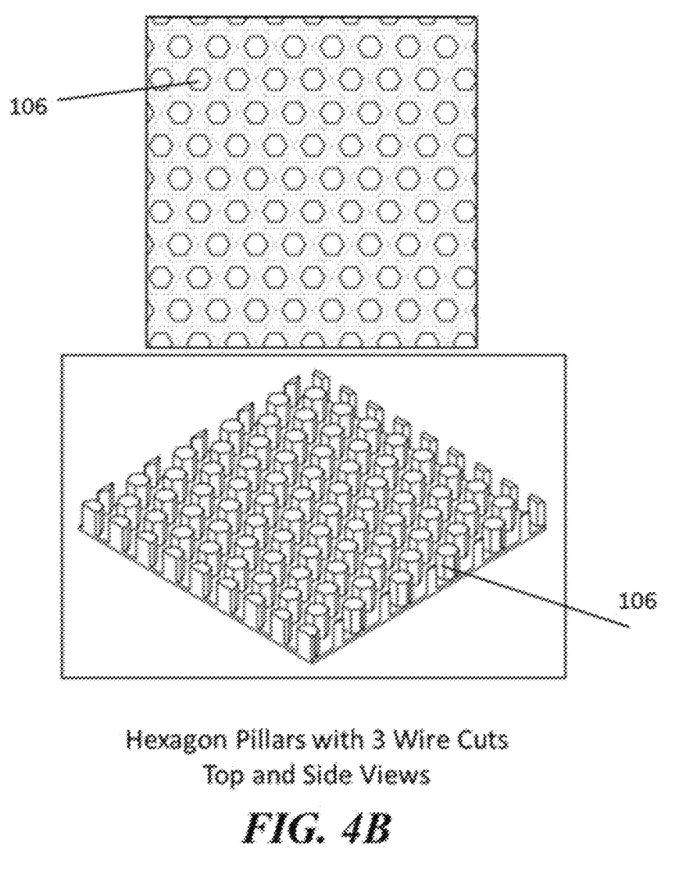

FIGS. 4A-4B show how a round pillar may be approximated using a hot wire cut machine. FIG. 4A shows how 4 hot-wire cut directions along the dotted lines can form octagonal pillars 106 with remaining foam base material 112. FIG. 4B shows how 3 hot-wire cut directions along the dotted lines can form hexagonal pillars 106. Without limitation, the hot wire cut operation could be replaced with an abrasive wire saw or vibrating operation.

FIGS. 5A-5E show many different design enhancements to the base thermoelectric string to protect the wires from breakage after repeated bending cycles when in the cushion after numerous sitting cycles. The objective of these enhancements is to limit the bend radius of the wire during the bending cycles. It has been known for a long time in the industry that putting a lower bound on the bend radius of a wire can increase its bend cycle life by several orders of magnitude.

Figure 5A:
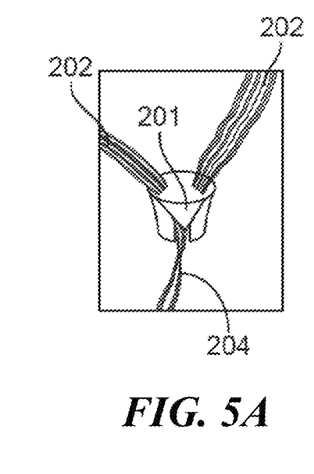
FIGS. 5A, 5B, 5C, 5D and 5E show various designs for strain relief of the thermoelectric string to improve its durability when combined with the cushion and used for a long period of time.

FIG. 5A shows a closed-cell foam plug in the shape of a cylinder 201. Without limitation, the plug may have a Y shape cut in the side for placement of the thermoelectric junction. Or, the plug may have a hole in the center and the junction inserted into the hole from above. The Y cut or the hole allows a path for the two links 202 and the one loop 204 of the thermoelectric junction to exit the foam plug. The hardness of the foam is selected to result in a gradual but not severe bending of the wire under compression from directly above. The attachment of the wire to the junction is protected inside the foam plug by preventing acute bending at this location. Without limitation, the material used for this purpose could be closed cell foam, open cell foam, Styrofoam, rubber, plastic, or gel.

Figures 5B, 5D:
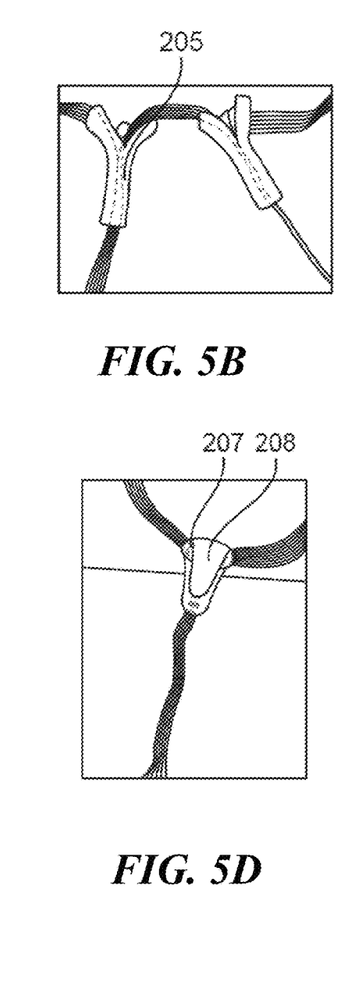

FIG. 5B shows another method for protecting the thermoelectric string. Here, a length of latex tubing 205 is cut partway down to form two flaps. The flaps protect the two links leaving the junction, and the tubular portion protects the loop's attachment to the junction. Without limitation, this material used for this purpose could be silicone, polyurethane, plastic, Teflon, gel, or any other similar material.

Figure 5C:
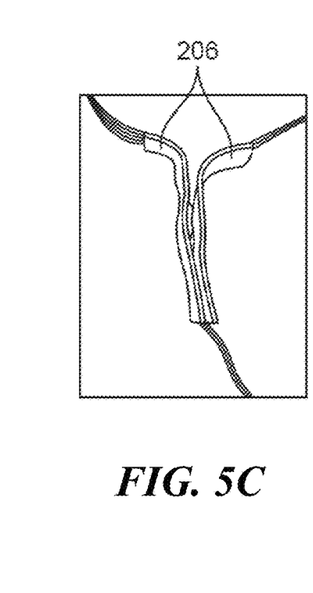

FIG. 5C shows another method for protecting the thermoelectric string. Here, lengths of fiberglass tape 206 are attached to the outside of the junction and extend along the loop and along the link to beyond the 90 degree angle at the surface. The tape adhered to the wire and junction forces a mild bend radius at all points where the tape is present. Without limitation, the material used could be foam tape, rubber tape, electrical tape, woven plastic tape, plastic tape, Teflon tape, gel tape, or any other similar material with adhesive or without such as liquid plastics that solidify after placement.

FIG. 5D shows another method for protecting the thermoelectric string. Here, a latex nipple 207, similar to those used in baby bottles, is used to limit the bend radius and protection the wire-to-board attachments. A foam plug 208 is used to maintain electrical insulation between the links. The loop wire is routed through a hole at the narrow end of the nipple. The links are routed over the wide end of the nipple. Without limitation, this nipple shape could be made of silicone, polyurethane, rubber, plastic, Teflon, gel, or any other similar material.

Figure 5E:
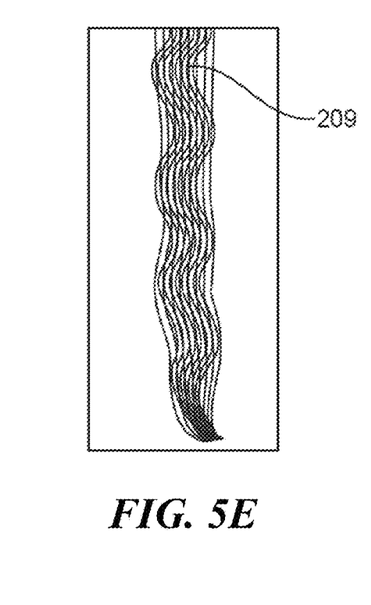

FIG. 5E shows a length of stranded wire 209 that is combined with cloth fibers to improve the tensile strength of the links and reduce the bending stress on the wires. When the cushion has the weight of a person's torso, the compression lengthens the surface of the foam, which in turn puts tensile stress on the links.

Now, we generalize the design of the thermoelectric ribbon further in a way that durability is achieved and is predictable. The physical process of metal wires flexing and then breaking is rooted in the repeated weakening of each bend. If the wire's strength is weakened even slightly on each cycle of stress, then breakage is likely to occur after the 3,000 to 100,000 stress cycles required for the durability of a consumer product. The slight weakening of a metal wire on each flex can be predicted by looking at its deformation. If the wire's original shape returns after the flex, then the deformation is elastic. If the wire's shape changes after the flex, then the deformation is plastic. Plastic deformation of a wire changes its physical properties and weakens the wire. Repeated plastic deformation of a wire is certain to lead to breakage. Repeated elastic deformation of a wire will last much longer. Plastic or elastic deformation is observable on a thermoelectric ribbon inserted into a panel on the first cycle of a durability test. Hence, the nature of the deformation on the first cycle of a thermoelectric panel is predictive of its durability. Further, a thermoelectric panel can be designed to only incur elastic deformation or to avoid plastic deformation, or both, as verified in the first cycle or a small number of cycles of a durability test.

Figure 6A:
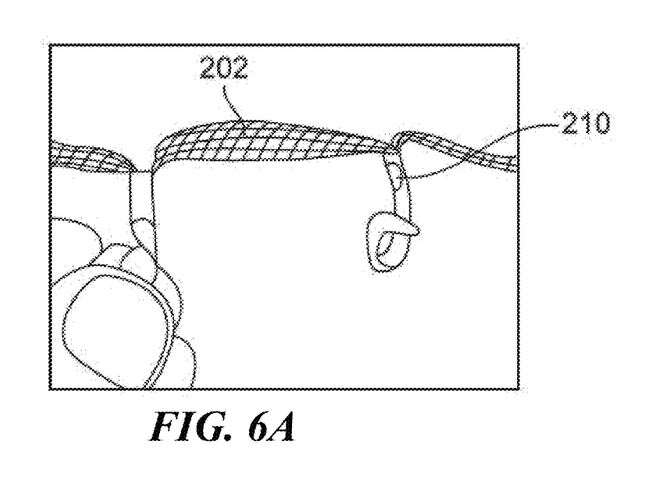
FIGS. 6A, 6B, 6C, 6D, 6E, 6F, 6G and 6H show a modified configuration for the thermoelectric string to improve its durability when combined with the cushion and used for a long period of time.
Figure 6B:
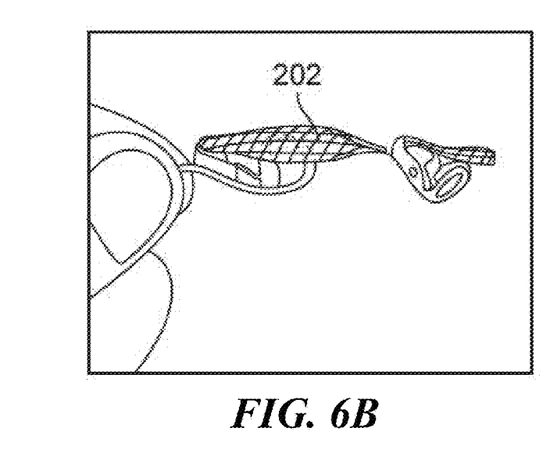

FIGS. 6A-6D show two designs of the thermoelectric ribbon, as it would appear in a panel. The panel is not shown for illustrative purposes. FIG. 6A is the traditional design with vertical junctions 210 inside the panel, horizontal links 202 along the surface of the panel, and curled heat exchangers underneath the junctions positioned in an airflow layer. After applying compression to this ribbon with an equivalent displacement of the standard durability test, the wires in the ribbon become plastically deformed as shown in FIG. 6B.

Figure 6C:
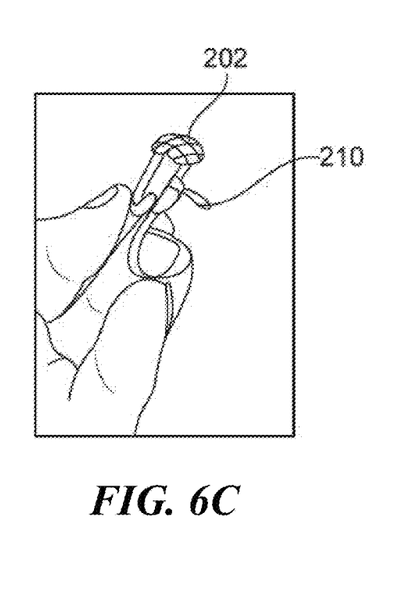
Figure 6D:
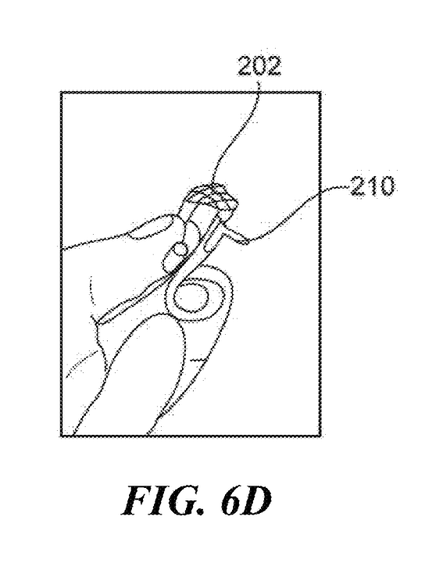

FIG. 6C shows the end view of the angled design, wherein the plane containing the lines of the junctions 210 intersects at a 45-degree angle the plane of the links 202 along the surface. FIG. 6D shows the string after a stress cycle that compressed the ribbon to a very narrow vertical clearance. The resting shape of the ribbon in FIG. 6D after compression stress has returned to that of FIG. 6C, indicating the absence of plastic deformation. Without limitation, all designs of a thermoelectric ribbon that avoid plastic deformation in a cycle of stress are covered by this invention.

The angled design of FIG. 6C can be inserted into the foam panel of the cushion 101 in FIG. 1A such that the junction 210 in FIG. 6C is positioned either above the pillar 106 in FIG. 1A or between the pillars. Placing the junction above the pillar allows the junction to be cushioned by the pillar in severe compression. Placing the junction between the pillar allows the wires to bend more freely in the soft foam and hence less susceptible to plastic deformation. Both placement locations have advantages depending on the stress conditions and the spring constants of the two foam layers.

Figure 6E:
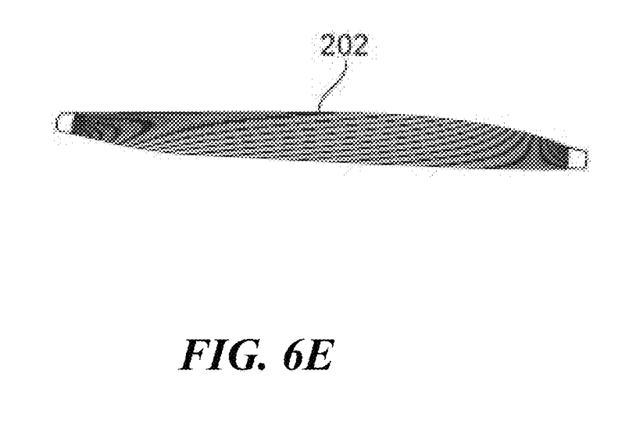
Figure 6F:
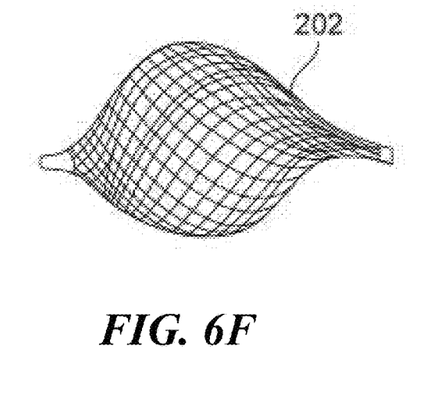
Figure 6G:
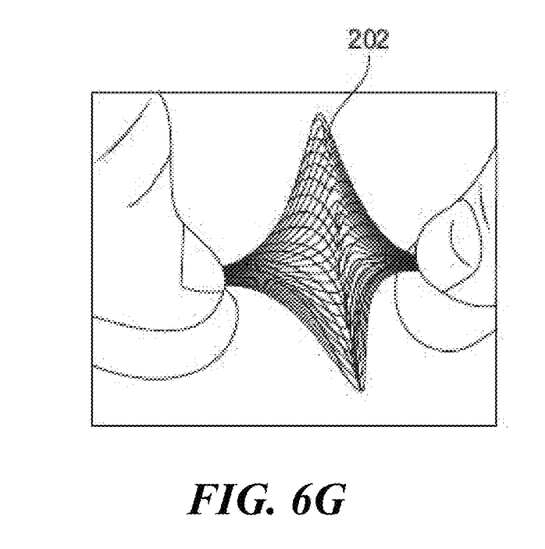
Figure 6H:
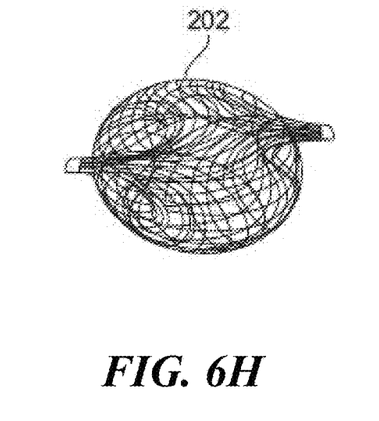

FIGS. 6E through 6F show how shaping the woven strands in link 202 can make the system more durable in a stress test. One failure mode of an office cushion occurs when the links 202 are forced to lengthen in order to accommodate the depression made in the foam when a person sits on it. With the fishnet-woven braid in FIG. 6A, the outer strands of the weave do not have sufficient slack to accommodate the necessary lengthening, which results in tensile stress on the wire strands where they join the junction. FIGS. 6F through 6H show steps in shaping the links wires to achieve more slack and hence lengthening capability under stress. First, in FIG. 6F, the terminated ends of the link 202 are pushed inwards towards each other, which creates a bulge on wires surrounding an empty cavity. Next, in FIG. 6G, the bulging section is folded into a Z shape, which shortens the length from termination to termination of the link. Then, the fold is flattened to achieve the final shape in FIG. 6H. Note how in FIG. 6H the fold lessens as the ends of the link are pulled away from each other. This slack in the link allows for further lengthening under stress of a person sitting on a cushion with these links 202 on the surface.

Figure 7A:
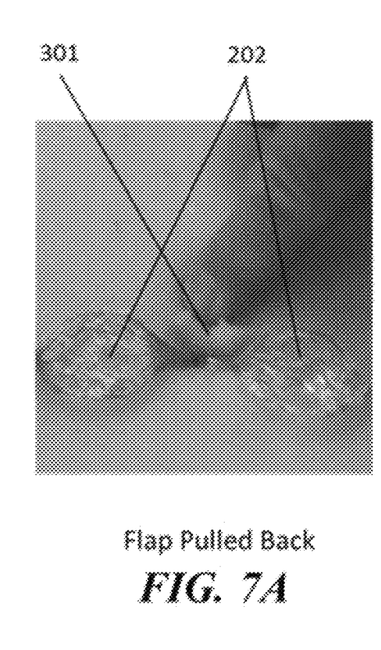
FIGS. 7A, 7B and 7C show methods for using existing materials in the thermoelectric panel, or adding new materials, to make the surface smoother for increased visual appearance and tactile feel when combined with the cushion.
Figure 7B:
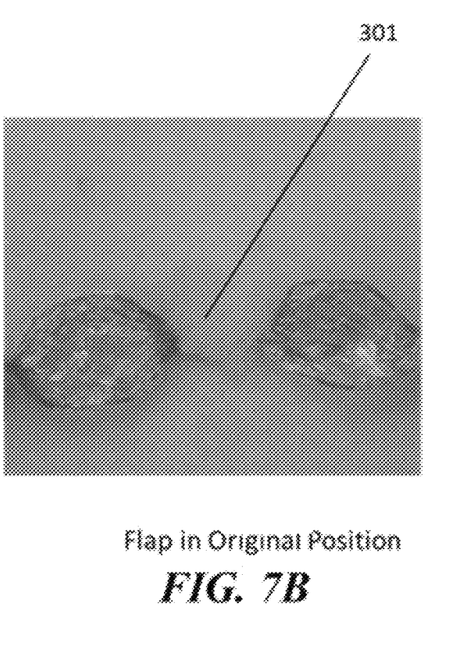
Figure 7C:
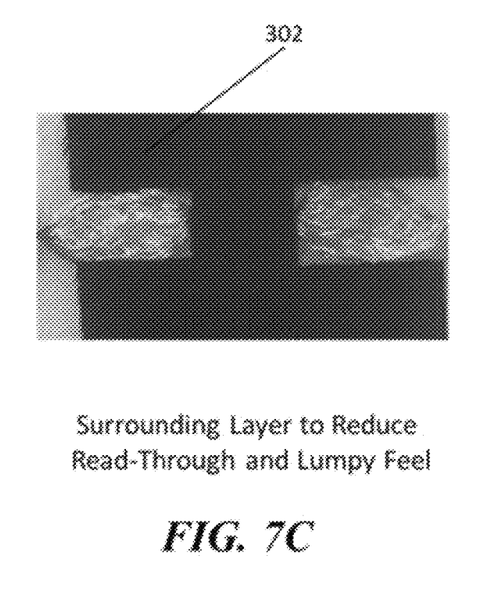

As previously mentioned, maintaining a radius of curvature of the wires is critical to prevent the wires from breaking under repeated sitting cycles of the thermoelectric panel in a cushion. Furthermore, it is desirable to make the foam surface as smooth as possible for tactile and visual appeal. FIGS. 7A-7C show a low-cost method for protecting the wire as it turns along the surface and additionally for smoothing the surface. A flap 301 is cut in the foam as shown in FIG. 7A using a U-shaped blade inserted at an angle to the surface. The flap 301 of foam is lifted up and the thermoelectric junction is inserted through to the airflow layer. Then the flap 301 is returned to it original position as shown in FIG. 7B. Now, the presence of foam both above and below the wire 202 at the point where it turns 90 degrees along the surface limits the curvature under pressure stress or rolling stress. This method of using the flap also reduces the "egg-crating" irregularity of the surface, which naturally results from the wire 202 being routed into and out of the surface foam. The surface of FIG. 7B is still irregular because of the profile height and rigidity of the wires 202 are elevated from the foam surface. This irregularity is easily seen and felt through many different types of covers. A thick cover can reduce this irregularity, but thick covers also degrade the thermal performance of the panel. Hence, a better solution is needed to smooth the surface without introducing thermal resistance. FIG. 7C shows such a method for smoothing the surface. A material 302 with the similar profile height and rigidity as the wire 202 is placed around the wire. In FIG. 7C, the material is a canvas cloth. Without limitation, any material that matches the height of the woven wire could be used. The material may be stretchy to match the hammock deformation of the underlying cushion when in use. The material may be made from, without limitation, a solid polyurethane sheet, tape, spandex cloth, closed cell foam sheet, or other suitable material.

In all of the embodiments of the thermoelectric panel in this and previous patent applications, the link wires along the surface are most effective when in close proximity to the skin of the person being heated or cooled, i.e. when the cover over the wires is thin. However, a human hand can feel these wires through a smooth thin cover and this tactile feel is undesirable. And, some covers will stretch over the wires during use and remain permanently stretched with an apparent bagginess pattern to the cover over time. Designs of covers that address these issues are covered in FIGS. 8A-8B.

Figure 8A:
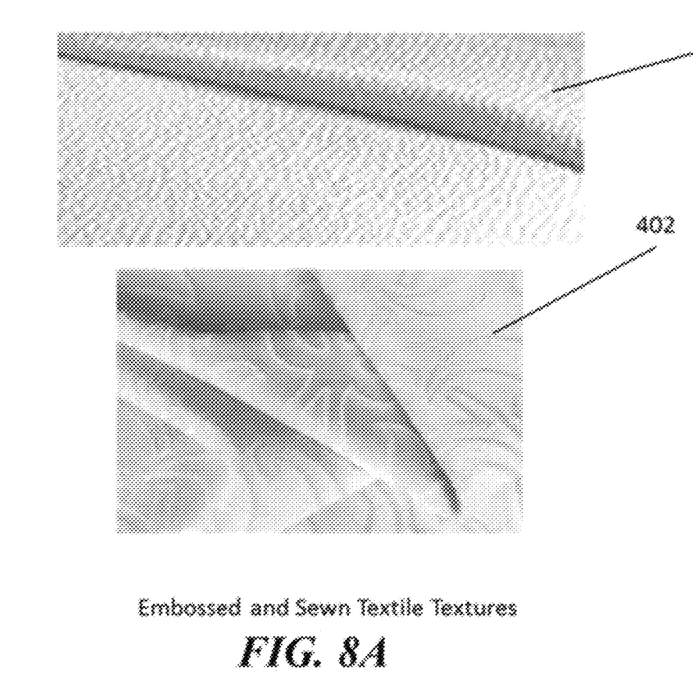
FIGS. 8A and 8B show textured covers for decoratively hiding the irregular surface appearance and feel of the thermoelectric string when covering the cushion.
Figure 8B:
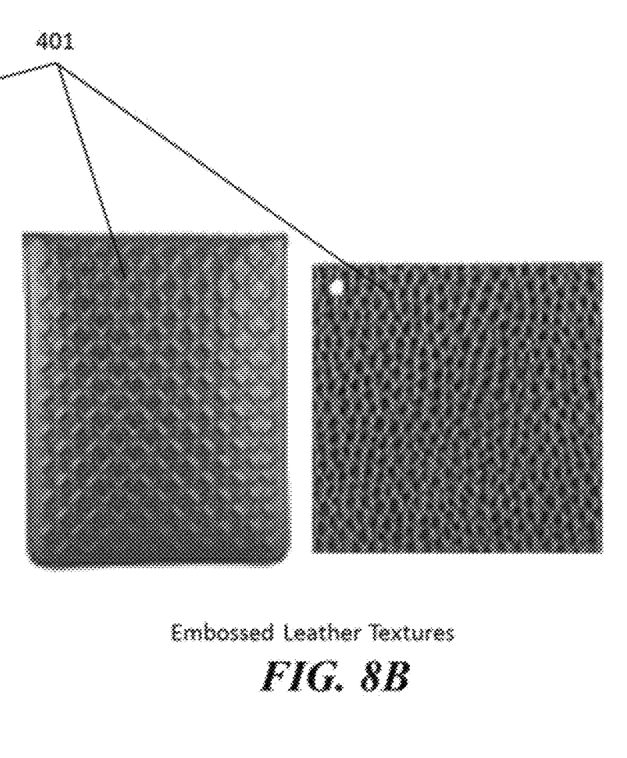

FIG. 8A shows an embossed bed cover 401 and a stitched textile pattern 402, which could be used as a cover over a thermoelectric panel. This cover is made from a thin material, like a bed sheet fabric, but the embossing or stitching creates peaks and valleys in the surface contour. A human hand moving along a thermoelectric panel with this cover will not be able to distinguish the embossed or stitched peaks and valleys with the feel of the wires underneath, especially and without limitation, if the spacing and size of the embossed or stitched features is comparable with the spacing and size of the wires. These covers also visually create a pattern that is visually indistinguishable from any pattern of bagginess from the cover stretching over the wires that might occur over time. And, because the embossed fabric 401 flattens under the weight of a person and the area of the stitching in 402 is very small, the net thickness during use is very thin. Hence, these patterned fabrics address the issues with the wires under the cover, optimizing the visual appearance, the tactile feel, and the thermal performance. FIG. 8B shows several embossed patterns for leather. Again, the embossed features flatten out under the weight of a person, allowing for good thermal conduction in the contact area.

Figure 9A:
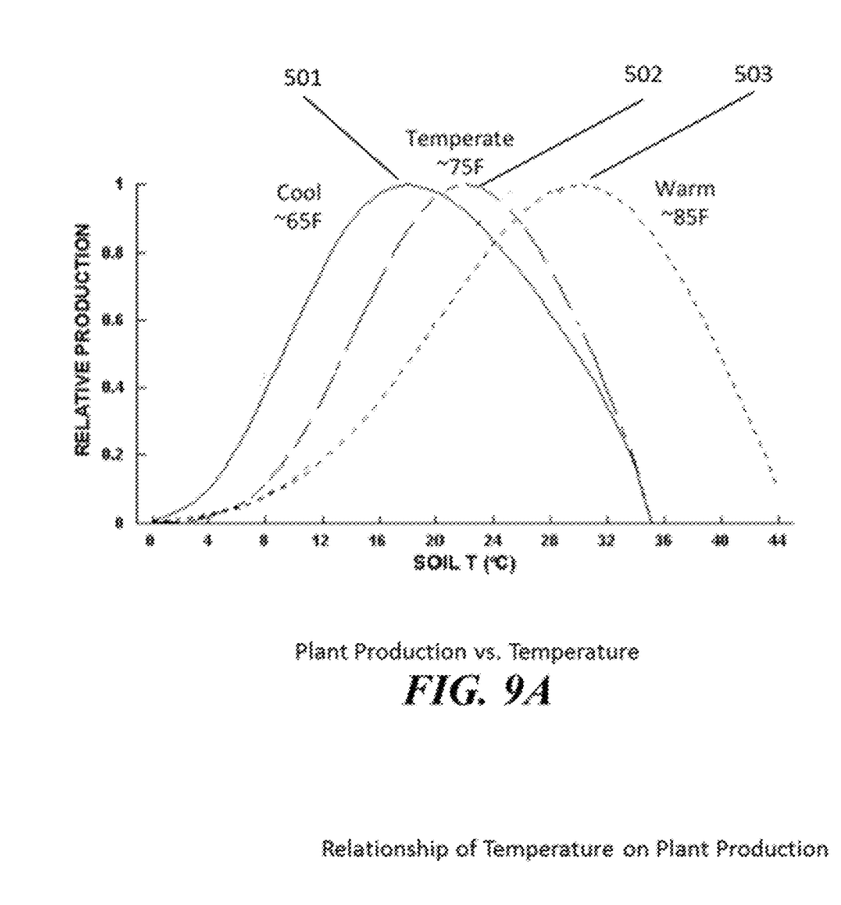
FIGS. 9A and 9B show how plant productivity is improved by controlling its soil temperature and lists the some of the plants that benefit from soil temperature control.
Figure 9B:
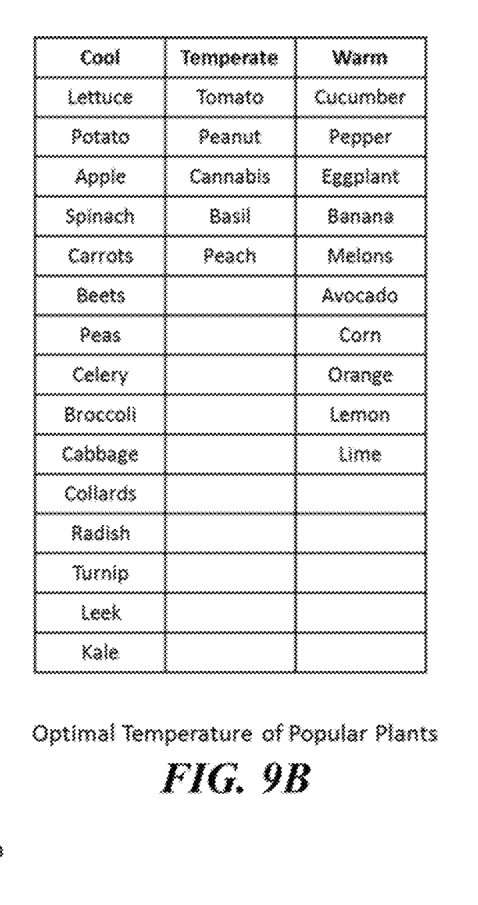

Another application for a thermoelectric string, panel, and possibly airflow layer is for controlling the temperature of soil for plants. FIG. 9A shows that the productivity of plants is a strong function of the soil temperature. Plants typically categorized as "cool season" plants have productivity profile 501, "temperature season" plants have productivity profile 502, and "warm season" plants have profile 503. These three profiles have optimal soil temperatures of approximately 65 F, 75 F, and 85 F respectively. FIG. 9B shows a list of plants in these three categories. It is desirable to grow warm season plants in the winter and cool season plants in the summer, and to be able to grow mixed combinations of plants in a single environment. Controlling soil temperature enables optimization of plant productivity and flexibility in the thermal environment of the plants.

Figure 10A:
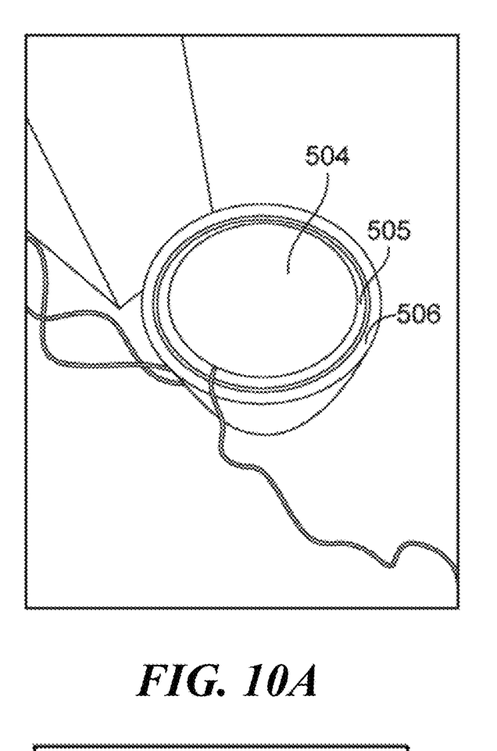
FIGS. 10A, 10B, 10C and 10D show an embodiment of the present invention that achieves heating and cooling of soil in a planter pot.
Figure 10B:
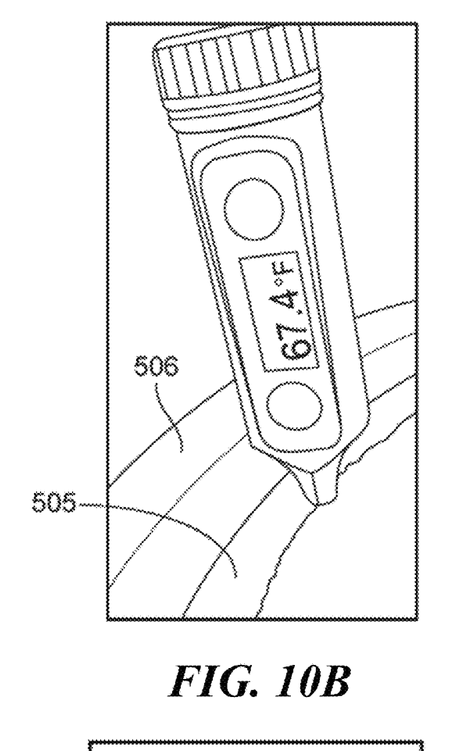
Figure 10C:
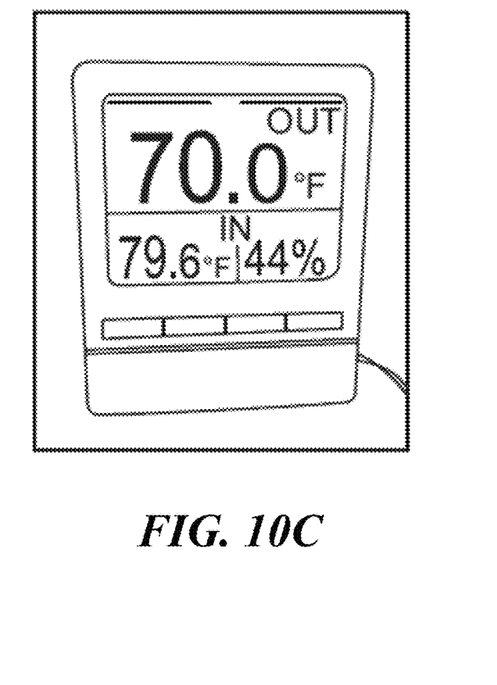
Figure 10D:
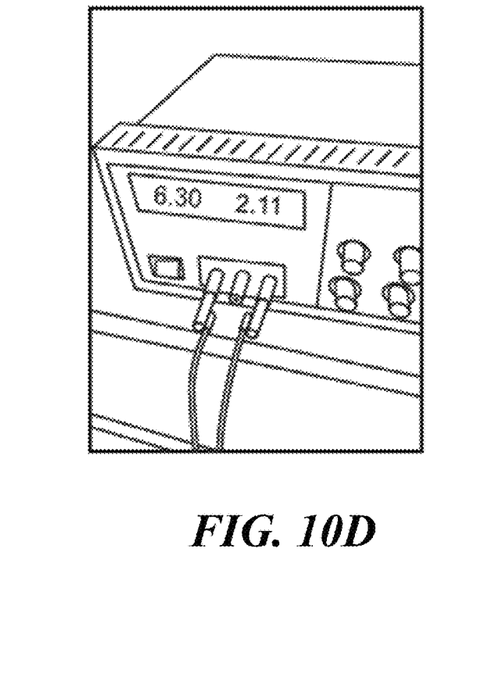

FIG. 10A shows a plant pot containing soil wherein the temperature of the soil is controlled by a thermoelectric string and panel. An insulating top layer 504 is needed to prevent heat transfer through the topsoil, and this layer could be made of decorative pumice stone or other material with good insulating properties. The pot consists of an inner wall 505 and an outer wall 506. Between these two walls is a thermoelectric panel. The apparatus of FIG. 10A does not contain an airflow layer, as natural convection removes heat from wall 506 when the soil is being cooled. By reversing the electrical current in the thermoelectric panel, the soil is warmed instead of cooled. The temperature probe in FIG. 10B shows that the soil near the side 506 is 67.4 F; FIG. 10C shows that the temperature of the soil in the center of the pot is 70.0 F and the ambient temperature is 79.6 F. These temperature readings were taken in steady state conditions and show that the soil is cooled by about 10 degrees F. from ambient by the thermoelectric panel, meeting the requirement to cover optimum temperature range of + or −10 F shown in FIG. 9A. FIG. 10D shows that this result was accomplished by applying 6.3 volts and 2.11 amps to the thermoelectric panel, which included a thermoelectric string of 85 junctions.

Figure 11:
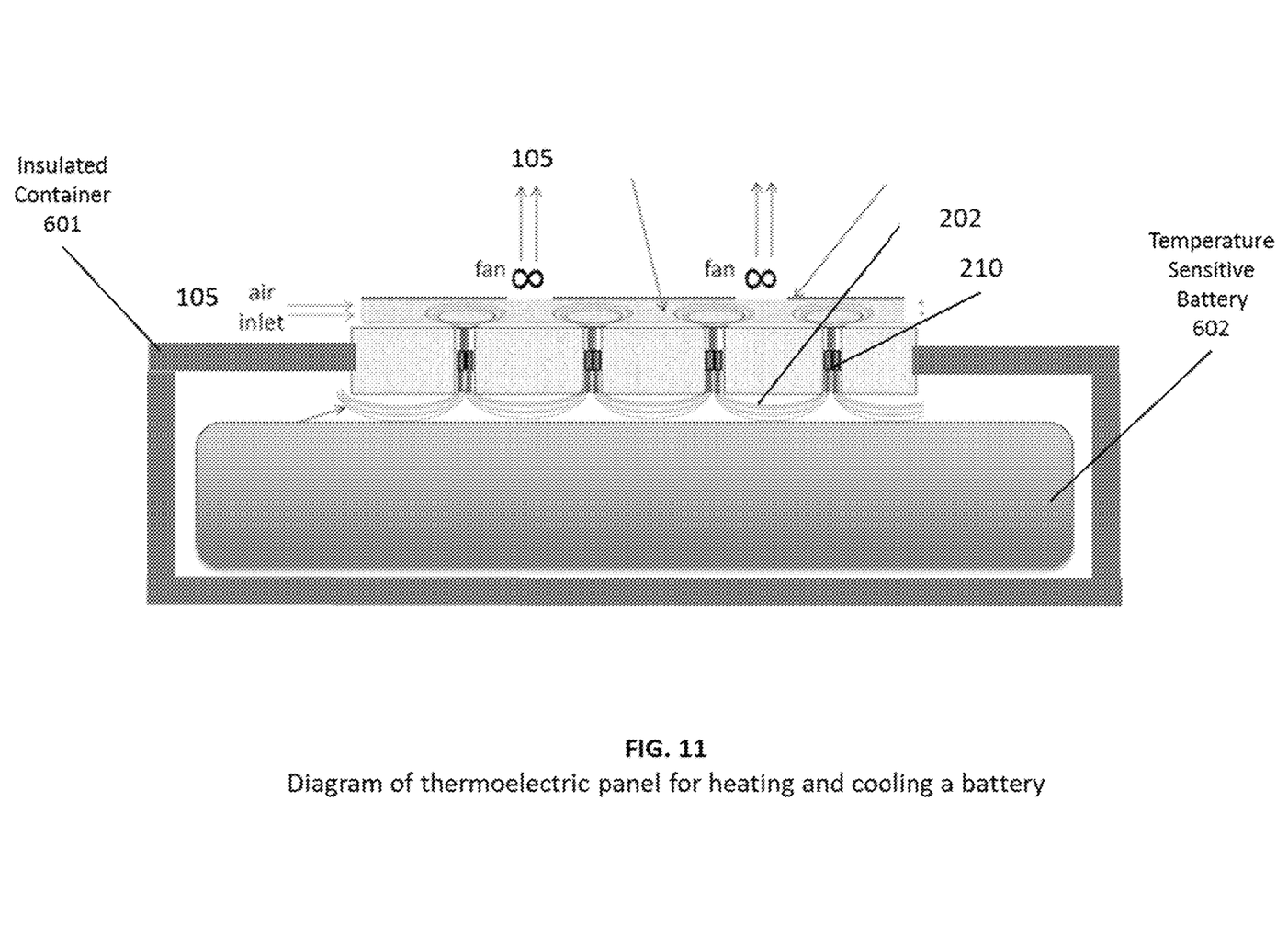
FIG. 11 shows a thermoelectric panel and airflow system for heating and cooling a battery to control its temperature.

Yet another application of a thermoelectric string, panel, and possibly an airflow layer is thermal management of batteries. Battery temperature needs to be controlled for three reasons: efficiency, lifetime, and safety. FIG. 11 shows how the a thermoelectric string 202 and 210 is in thermal contact with a battery 602 on one side and possibly an airflow layer on the other side that contains moving air 105. Alternatively, a cold plate that is in thermal contact with the loop wires could replace the airflow layer. An insulated container 601 is added if the temperature outside the battery is adversely affecting its temperature in the regions beyond the thermoelectric panel.

Figure 12A:
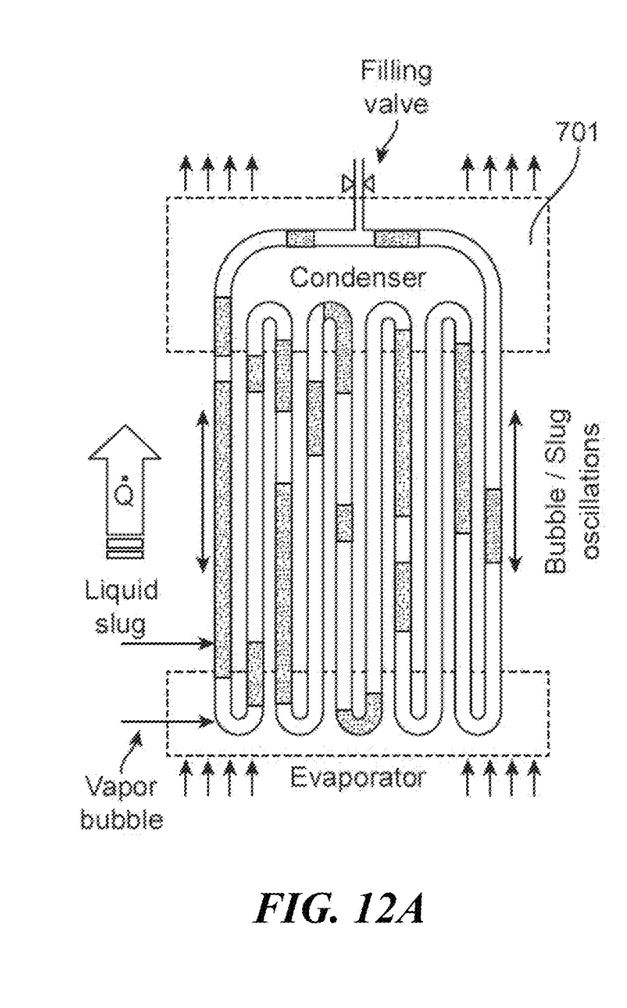
FIGS. 12A, 12B, and 12C show how a thermoelectric panel may be combined with a heat spreader to aid in moving the airflow system to the side of the panel.
Figure 12B:
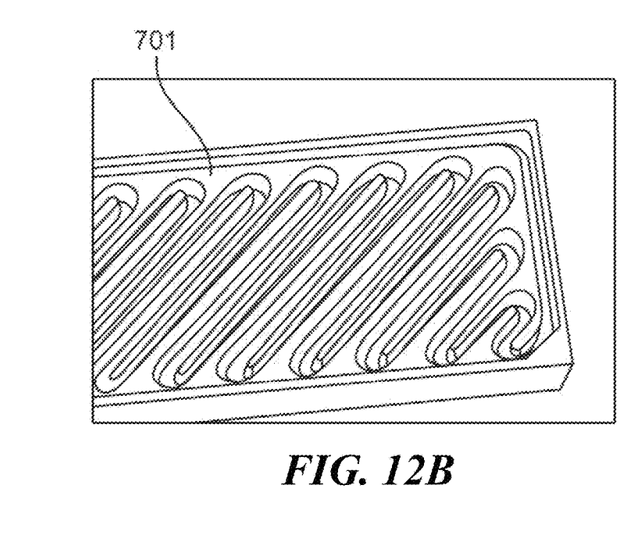
Figure 12C:
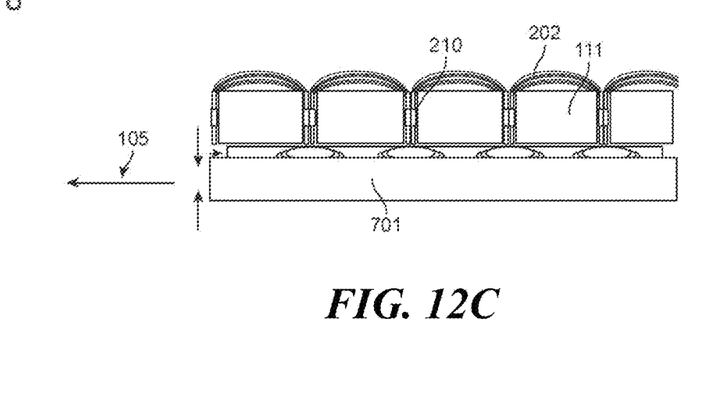

Many applications for thermoelectric panel are challenged in having the airflow layer covering one whole side of the panel. In seating and bedding, for example, forming an airflow layer underneath the panel and under the weight of the user presents design and form-factor challenges in some cases. In these cases, it is helpful to have a heat spreader that can move the excess heat to another location that is more convenient for the airflow layer or other heat exchanger. FIG. 12A illustrates a thin plate 701 with a moving fluid inside that moves heat very effectively from the flat area to the sides. FIG. 12B shows an actual product from ThermAvant Technologies, Inc. that spreads heat using this method. In FIG. 12C, this heat spreader 701 is mounted underneath, and in thermal contact with, the thermoelectric panel 111. Because of the spreader 701 essentially conducts heat very effectively, the airflow 105, or other heat exchanger, may be moved to another location. In FIG. 12C, this new location is at the end of the spreader 701.

Without limitation, the inventions described herein can be applied to seats, seat backs, seat tops, bed tops, wheelchair cushions, hospital beds, animal beds, and office chairs.

What is claimed is:

1. A thermoelectric device comprising a plurality of thermoelectric elements and a plurality of thermoelectric strings, wherein said plurality of thermoelectric elements are in at least one layer of foam in a manner such that said plurality of thermoelectric strings have reduced susceptibility to deformation, wherein said plurality of thermoelectric strings comprises strings in a folded-over configuration away from said plurality of thermoelectric elements and adjacent to a surface of said at least one layer of foam, wherein said plurality of thermoelectric elements are disposed in a first plane and said plurality of thermoelectric strings are disposed in a second plane, wherein said first plane intersects said second plane.

2. The device of claim 1, further comprising an electrical power source in electrical communication with said plurality of thermoelectric elements.

3. The device of claim 1, further comprising a strain relief element that is configured to provide strain relief to a thermoelectric string of said plurality of thermoelectric strings.

4. The device of claim 3, wherein said strain relief element is insulated from said plurality of thermoelectric strings.

5. The device of claim 3, wherein:
(a) said strain relief element is a foam plug that encapsulates said plurality of thermoelectric elements and comprises channels for said plurality of thermoelectric strings to exit said plug;
(b) said strain relief element is a Y-shaped foam plug or a drilled hole;
(c) said strain relief element comprises tubing and flaps or nipples formed of a polymeric material;
(d) said strain relief element comprises a tape attached along said plurality of thermoelectric strings and extending beyond said plurality of thermoelectric elements;
(e) said strain relief element comprises tape that includes fibers for increased tensile strength of said tape; or
(f) said strain relief element comprises fibers woven together with said plurality of thermoelectric strings.

6. The device of claim 5, wherein said polymeric material comprises latex, rubber, silicone, Teflon, polyurethane, or plastic.

7. The device of claim 5, wherein said tape is formed of foam, rubber, plastic, Teflon, gel, or a solidified liquid.

8. The device of claim 5, wherein said fibers are formed of glass, nylon or cloth.

9. The device of claim 1, wherein said plurality of thermoelectric strings comprise links of woven wires.

10. The device of claim 9, wherein said folded-over configuration includes multiple folds of said links of said plurality of thermoelectric strings.

11. The device of claim 1, further comprising a material between at least a portion of said plurality of thermoelectric strings positioned along said surface of said at least one layer of foam.

12. The device of claim 1, further comprising a textured material covering said at least one layer of foam.

13. The device of claim 1, further comprising a heat spreader configured to facilitate movement of excess heat away from said at least one layer of foam.

14. The device of claim 13, wherein said heat spreader comprises fluid flow or phase change material.

15. The device of claim 1, further comprising an occupancy switch that regulates supply of power to said plurality of thermoelectric elements for heating or cooling.

16. The device of claim 1, further comprising an enclosure having said at last one layer of foam.

17. The device of claim 1, wherein said plurality of thermoelectric stings are disposed in a flap of foam in said at least one layer of foam.

18. The device of claim 1, wherein said at least one layer of foam comprises a plurality of layers of foam.

19. The device of claim 1, wherein said deformation is plastic deformation.

* * * * *